No. 714,824. Patented Dec. 2, 1902.
A. SCHWARTZ.
PROCESS OF STARTING INDUCTION MOTORS.
(Application filed Mar. 18, 1901.)
(No Model.)

Witnesses:
A. M. Wilson
R. H. Burr

Alfred Schwartz
Inventor
By W. Singer
Atty.

UNITED STATES PATENT OFFICE.

ALFRED SCHWARTZ, OF COLOGNE, GERMANY, ASSIGNOR TO HELIOS ELECTRICAL CONSTRUCTION COMPANY, OF COLOGNE-EHRENFELD, GERMANY.

PROCESS OF STARTING INDUCTION-MOTORS.

SPECIFICATION forming part of Letters Patent No. 714,824, dated December 2, 1902.

Application filed March 18, 1901. Serial No. 51,734. (No model.)

*To all whom it may concern:*

Be it known that I, ALFRED SCHWARTZ, a subject of the German Emperor, and a resident of Cologne, Germany, have invented certain new and useful Improvements in Processes of Starting Induction-Motors, of which the following is a specification.

My present invention provides an improved process of starting induction-motors, whereby also single-phased motors may be started by utilizing an automatic clutch or coupling and whereby the starting-current in motors for single-phased or multiphased currents may be greatly reduced, so that larger types of motors may be constructed with short-circuit armatures than has been heretofore possible with respect to the high starting-current. Moreover, the new method enables special devices for displacing the phases in the auxiliary phase employed in asynchronous single-phased motors to be omitted. In some cases the auxiliary phase may be dispensed with.

The principle involved by the invention is as follows: The shaft of the armature is extended on either side and journaled so that the armature may be easily shifted in axial directions. When the armature having, for instance, a short-circuit winding is located in its stator field-coil and when inserted into the circuit, the armature will be pushed axially out from the field, and in this position, in which it is partially out of the field, it will be started without charge after a slight rotation is imparted to it either by hand or otherwise, said armature making its normal number of revolutions after a short time. When the same rotates at its normal speed, just at the moment of synchronism it is again pulled into the field and then coupled by means of a clutch also operated at this moment by the axial movement of the shaft. By reason of said clutch the motor—for instance, a single-phased motor—will be coupled to its charge only after the synchronism is reached. Experiments have proved that the starting of the motor under charge in this manner is effected in a few seconds.

The above method will now be clearly described with reference to the accompanying drawings.

Figure 3:
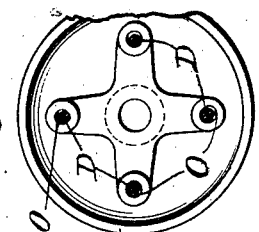
Figure 1:
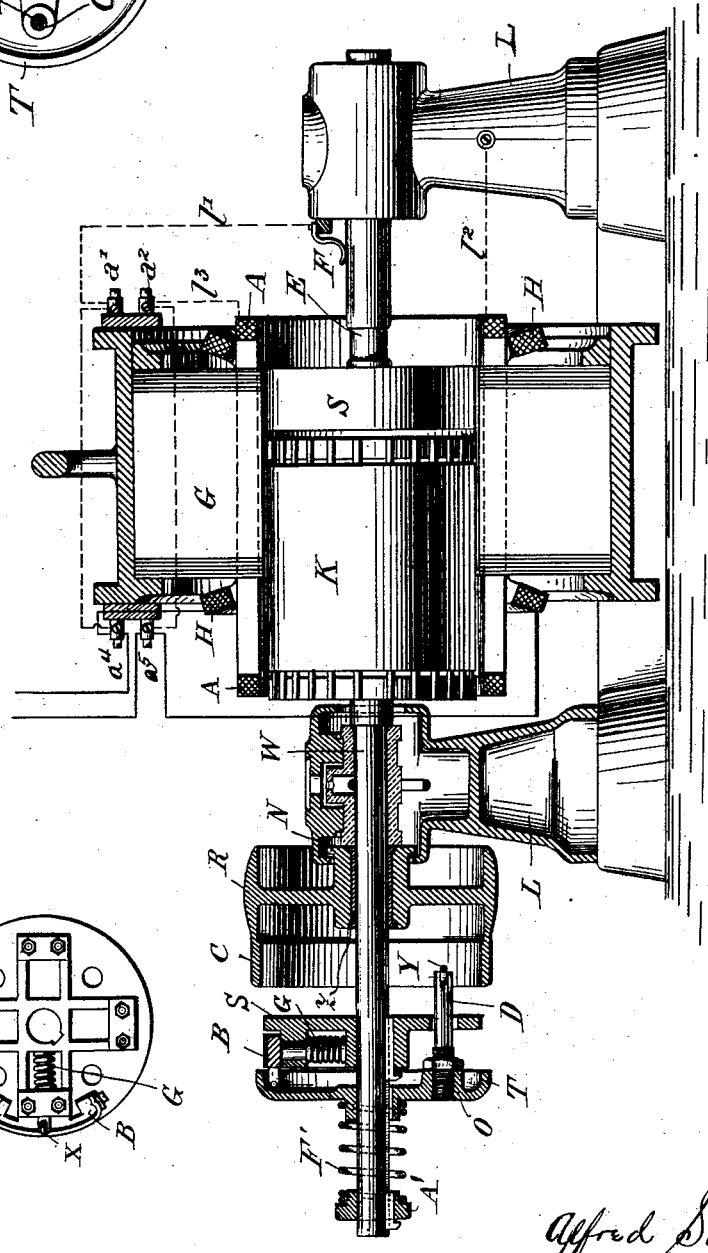
Figure 2:
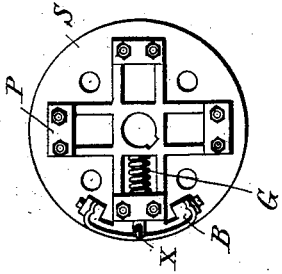

Figure 1 is a central longitudinal sectional view of a motor, the casing, the pulley, and clutch-disk, and disengaging device and showing the armature partially out of the casing. Fig. 2 is a rear elevation of the clutch-disk. Fig. 3 is a front elevation of the disengaging device, partly broken away.

The repelling force between the field-magnets G, Fig. 1, and the armature K, which in Fig. 1 is shown shifted laterally, so as to bring the armature outside the field, is produced by the fact that by reason of the action of lines of force of said field high-potential currents will be induced in the windings of the armature, the repelling force of said currents being considerably stronger than the attractive force of the magnetism induced in the iron core of the armature. On the other hand, when the armature occupies said position outside the field before the starting and when it is then inserted into the field said armature will certainly remain in said position for the reason stated. In this position a polyphase current-motor will be started by itself, while a single-phase current-motor requires but a slight push in the direction of its rotation. It is well known that a single-phase motor, the armature of which is in its normal position, cannot be started even when a slight rotation is imparted to it, as the reaction produced by the induced currents in the armature is too strong and as the action of the field is too greatly reduced for this reason. When the armature is in the position outside the field, which position will be termed "starting" position, it will be seen that the currents in the armature are considerably weaker, as a portion only of the windings is influenced by induction. Therefore the reaction of the armature is also weaker and a slight push against the armature will be sufficient to start the motor, which will rotate at the normal speed after a short time. Then when the motor works nearly synchronously the currents induced in the armature will be nearly zero and the magnetic attractive force on the iron core will be superior, whereby the armature is drawn to the normal operative position. The arrangement that the armature in its starting position is partially out of the field serves the same purpose as the insertion of a resistance into the armature. However, it will be seen that in my improved construction any material resistance will be dispensed with.

In order to automatically impart the slight starting rotation to the armature of single-phased motors, I utilize the well-known method of producing by the combination with the main winding H, Fig. 1, of an auxiliary winding A, an operative field starting the armature and giving the same the normal speed. In order to enable a field of this kind to be produced by means of the auxiliary winding A, both windings must be displaced with respect to each other, and, moreover, in the winding A must be produced a current displaced in its phase with respect to the current in the main winding. Heretofore this result has been attained by inserting induction-coils, condensers, or other similar devices. I have provided a much simpler method for attaining the desired result. The characteristic feature thereof is that the winding A, which is connected to the circuit, is extended on one side beyond the main winding H in the axial direction, so that the winding completely or almost completely surrounds the armature when the latter is in its starting position. The coils H are directly connected with the diaphragm tension, while the coils A are arranged parallel to the main winding, as shown in Fig. 1. By reason of the fact that the number of windings in the starting-coil A with respect to the number of windings in the main coil H, and therefore the self-induction, is reduced and that by selecting a suitable material of small conductivity the ohm resistance is increased I already obtain a displacement of the phases of the currents in the main and auxiliary windings; but this would not be sufficient to produce the above-named starting-field. The extension of the auxiliary winding beyond the main winding produces a further displacement of the phases of said currents, as it will be noted that the starting-coil A by reason of its forward position induces the entire winding of the armature K, while the main coil H influences but a portion of said armature. Now when the relation between the induction-motor and a transformer is considered the armature is to be considered as a short-circuit secondary coil of a transformer, while the starting-coil is equivalent to the primary coil of a transformer. Thus it will be seen that an increase of the watt component of the current in the winding A with respect to the same component in the winding H, and therefore a further displacement of the phases between the currents in both coils, will be obtained. Said displacement may still be increased by arranging adjacent to the armature K on the shaft W of the latter a wound or plain iron body S, which may be lamellated or solid, so that it fills partially or completely the space left in the field by the armature K when the latter is in its starting position. Said body S immediately reinforces the field and increases, therefore, the self-induction in the inducing-windings. This increase has a higher effect in the main coil H than in the starting-coil A by reason of the greater number of windings in the former. The starting-field thus produced will be sufficient to start the single-phased motor in a very short time. The iron body S has a further advantage for induction-motors. By reason of the increase of self-induction in the windings it reduces considerably the starting-current and permits, therefore, of a further application of the short-circuit armature. When said body is provided with windings, it may be employed as an auxiliary armature, reinforcing the starting-field and reducing the time of starting. Moreover, its magnetic resistance may thereby be modified. Then when the single-phased motor runs at its normal speed the starting-coil may be cut out. This is automatically effected by the axial movement of the armature produced at this moment. To this end I may employ, for instance, the device hereinafter described. The two starting binding-posts $a'$ and $a^2$ are connected to the main binding-posts $a^4$ $a^5$, so that they lie parallel to the main windings H of the motor. The clamps $a'$ and $a^2$ are arranged parallel to the main winding H for the purpose of enabling the coils A to be disengaged independent of the main winding. (See Fig. 1.) The wire connects the binding-post $a'$ to a spring F, insulated on the frame of the motor—for instance, on the bearing thereof—and sliding on the shaft, whereby it is electrically connected to the wire $l^2$, secured but not insulated on the bearing. $l^2$ leads to the starting-coil A, connected in turn by the wire $l^3$ to the second binding-post $a^2$. Thus the circuit of the starting-coil will be closed when the armature is in its starting position. When the armature is brought to the operative position, the spring F will come to the recess E, and thereby open the circuit, as it no longer engages the shaft W. When the armature is again brought to its starting position, the spring F is again brought into contact with the shaft, whereby the motor is prepared for the next starting. By reason of the lateral shifting imparted to the armature of an induction-motor at the moment it reaches the normal speed the centrifugal clutch (shown in Fig. 2) will be engaged. The motor is therefore able to attract the full charge in the best manner when it has reached its maximum number of revolutions, the arrangement being such that the coupling is effected at that moment only. In order to secure the engagement and disengagement of the clutch just at the moment the motor runs at its full speed, I provide on the laterally-movable driving part of the clutch a special disconnecting device, whereby the coupling is only effected when the required number of revolutions has been reached.

Loosely mounted on the journal Z is a belt-pulley R, said journal being movable to the right in the bearing L, Fig. 1. The overlapping edge N prevents the pulley from being moved to the left. The inner cylindrical wall C of the extended part of the pulley receives the engaging jaws B, guided in the perforated projections of the disk S and moved radially toward the shaft by the action of springs G. Each of the jaws carries on one side a small roller X, which is located under the curved rim T when the motor does not run at the required speed. The disk S is keyed on the shaft W, while T is adapted to slide longitudinally on the latter. The relative rotation between S and T is avoided by means of four bolts D, screwed in the part T and extending through holes o in the disk S. The free ends of said bolts are also provided with small rollers Y. Arranged between T and the collar A', keyed on the shaft, is a coil-spring F', which serves to soften the shocks in coupling and uncoupling the pulley. So long as the speed of the motor is under the normal full speed the clutch-disk will be disengaged from the belt-pulley R. Furthermore, the jaws B cannot be influenced by the centrifugal force, as the spring E' holds the curved rim T over the rollers X; but when the full speed is obtained and when the armature pulls the shaft toward the right the jaws B will partially enter the hollow cylinder C. At the same time the disk T is moved in the same direction by the spring F', said disk being pushed back at the moment the small roller Y engages the wall K of the pulley, whereby the disk S enters alone the cylinder C, as the rollers X are now disengaged from T. Thus the jaws B are influenced by the centrifugal force, whereby a sudden coupling with radial pressure is produced. When the motor is cut out, the armature will be moved to the right out of the field, and the centrifugal force of the jaws will be quickly decreased, so that the springs G may move the same toward the shaft and that the rollers X may again be brought under the retainer T.

Having fully described my invention, what I claim, and desire to secure by Letters Patent, is—

A process of starting induction-motors, which consists in pushing the armature out of the field when the field-coil is inserted in the circuit, imparting a slight rotation to said armature whereby the motor may be rotated at its normal speed, then bringing the armature back into the field, and automatically operating a clutch device through the movement of the armature, substantially as described.

In testimony whereof I have hereunto set my hand in presence of two witnesses.

ALFRED SCHWARTZ.

Witnesses:
CHARLES LESIMPLE,
KARL SCHMITT.